US012504800B2

(12) United States Patent
Zheng et al.

(10) Patent No.: US 12,504,800 B2
(45) Date of Patent: Dec. 23, 2025

(54) CAPACITOR COUPLED IN PARALLEL TO A RECTIFYING ELEMENT OF A RECTIFIER IN POWER-OVER-ETHERNET POWERED DEVICE TO BYPASS NOISE FROM POWER LINE

(71) Applicant: HEWLETT PACKARD ENTERPRISE DEVELOPMENT LP, Spring, TX (US)

(72) Inventors: Jiguang Zheng, Beijing (CN); Yue Sun, Beijing (CN); Hongli Zhang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 317 days.

(21) Appl. No.: 18/470,840

(22) Filed: Sep. 20, 2023

(65) Prior Publication Data

US 2025/0093923 A1    Mar. 20, 2025

(51) Int. Cl.
| | |
|---|---|
| *G06F 1/26* | (2006.01) |
| *H02M 1/00* | (2006.01) |
| *H02M 1/32* | (2007.01) |
| *H02M 1/44* | (2007.01) |
| *H02M 7/06* | (2006.01) |
| *H04L 12/10* | (2006.01) |

(52) U.S. Cl.
CPC ............ *G06F 1/26* (2013.01); *H02M 1/0064* (2021.05); *H02M 1/32* (2013.01); *H02M 1/44* (2013.01); *H02M 7/06* (2013.01); *H04L 12/10* (2013.01)

(58) Field of Classification Search
CPC . G06F 1/26; H02M 1/44; H02M 7/06; H02M 1/0064; H02M 1/32; H04L 12/10
See application file for complete search history.

(56) References Cited

U.S. PATENT DOCUMENTS

| 4,442,482 A | * | 4/1984 | Gallios | ............... H02M 7/06 363/61 |
| 5,437,040 A | * | 7/1995 | Campbell | ............ G01R 31/40 713/340 |
| 7,366,297 B1 | | 4/2008 | Marshall et al. | |
| | | (Continued) | | |

OTHER PUBLICATIONS

Di Maria, G., "Tutorial: Adding Capacitors in Parallel on a Graetz Bridge Rectifier," Apr. 20, 2023, Power Electronics News, https://www.powerelectronicsnews.com/tutorial-adding-capacitors-in-parallel-on-a-graetz-bridge-rectifier/.

(Continued)

*Primary Examiner* — Yusef A Ahmed
(74) *Attorney, Agent, or Firm* — Jones Robb PLLC (57) ABSTRACT

A power-over-Ethernet (PoE) powered device (PD) includes a PoE interface to receive a connector of an ethernet cable to connect the PD to a PoE power sourcing equipment (PSE). The PD includes a first power line connected to the PoE interface to receive PoE power from the PSE in a connected state of the PD to the PSE. The PD also includes a rectifier including a first input connected to the first power line, a first output connected to a first terminal of a PD chip, and a first rectifying element connected between the first input and first output. The PD further includes a first capacitor connected in parallel to the first rectifying element between the first input and the first output. AC noise appearing on the first power line is bypassed around the first rectifying element via the first capacitor.

17 Claims, 8 Drawing Sheets

(56) References Cited

U.S. PATENT DOCUMENTS

| | | | | |
|---|---|---|---|---|
| 11,503,703 B2* | 11/2022 | Worley | | H05B 45/59 |
| 2002/0036431 A1* | 3/2002 | Vogman | | H02J 9/061 |
| | | | | 307/87 |
| 2006/0215343 A1* | 9/2006 | Camagna | | H04M 3/18 |
| | | | | 361/111 |
| 2006/0238250 A1* | 10/2006 | Camagna | | H03F 1/52 |
| | | | | 330/253 |
| 2006/0285367 A1* | 12/2006 | Yasumura | | H01F 37/00 |
| | | | | 363/21.03 |
| 2007/0071112 A1* | 3/2007 | Gattani | | H04L 25/0272 |
| | | | | 375/257 |
| 2007/0177411 A1* | 8/2007 | Picard | | H04L 12/10 |
| | | | | 363/35 |
| 2007/0208961 A1* | 9/2007 | Ghoshal | | G06F 1/189 |
| | | | | 713/300 |
| 2007/0297201 A1* | 12/2007 | Lee | | H04L 25/0266 |
| | | | | 363/21.06 |
| 2008/0074906 A1* | 3/2008 | Tsai | | H04L 12/10 |
| | | | | 363/21.01 |
| 2008/0238447 A1* | 10/2008 | de la Torre Vega | | H04L 12/10 |
| | | | | 324/676 |
| 2008/0291039 A1* | 11/2008 | Picard | | G01R 31/58 |
| | | | | 340/652 |
| 2009/0009918 A1* | 1/2009 | Beland | | H02M 1/088 |
| | | | | 361/58 |
| 2013/0093444 A1* | 4/2013 | Maniktala | | H04L 12/12 |
| | | | | 324/713 |
| 2013/0187632 A1* | 7/2013 | Ohana | | H04L 12/10 |
| | | | | 324/103 R |
| 2015/0035365 A1* | 2/2015 | Picard | | H04L 12/10 |
| | | | | 307/39 |
| 2016/0043633 A1* | 2/2016 | Phadke | | H02M 1/10 |
| | | | | 363/21.08 |
| 2017/0041153 A1* | 2/2017 | Picard | | H04L 12/10 |
| 2017/0177051 A1* | 6/2017 | Ferentz | | H04L 12/12 |
| 2018/0074567 A1* | 3/2018 | Darshan | | H04L 12/10 |
| 2018/0227132 A1* | 8/2018 | Picard | | H05B 47/187 |
| 2019/0045598 A1* | 2/2019 | Hsia | | H02J 7/0068 |
| 2025/0193034 A1* | 6/2025 | Zheng | | G06F 1/26 |

OTHER PUBLICATIONS

Mrjayviper, "Paralleling Capacitors Across a Rectifier Diode: Would This Work for a Full-Wave Rectifier with Center-Tap Ground? What Value/Capacitor Type is Recommended for This Application?", retrieved from <https://www.reddit.com/r/AskElectronics/comments/xiummi/paralleling_capacitors_across_a_rectifier_diode/?rdt=61773> Oct. 2022, 6 pages.

* cited by examiner

CAPACITOR COUPLED IN PARALLEL TO A RECTIFYING ELEMENT OF A RECTIFIER IN POWER-OVER-ETHERNET POWERED DEVICE TO BYPASS NOISE FROM POWER LINE

Power-over-ethernet (PoE) allows for data signals and electrical power signals to be communicated over the same ethernet cable. This ability to receive power and data via the same cable may provide more flexibility in how the device can be deployed (e.g., the device may no longer need to be positioned near a power outlet or have long power cables to reach such an outlet) and/or may provide the device with a power redundancy. In a PoE system, a device that provides the PoE power to other connected devices is referred to as a Power Sourcing Equipment (PSE) and the devices that receive the PoE power from the PSE are referred to as Powered Devices (PD). Often, a PSE also serves as a networking element for directing data traffic through the network, such as a network switch or router. PDs may also be networking elements (e.g., a wireless access point, a PoE repeater/hub, etc.), or client devices (e.g., a security camera, an internet-of-things (IoT) device, etc.), or any other electronic device with PoE capability. In addition, some devices may function as both a PD (by receiving PoE power from an upstream PSE) and a PSE (by supplying PoE power to a downstream PD).

Generally, when an ethernet cable is initially connected to a PSE, the PSE goes through a detection process to determine whether there is a valid PD capable of receiving PoE power at the other end of the cable. This detection process comprises applying predetermined voltages to certain conductors of the ethernet cable, measuring the resultant currents flowing along the conductors, calculating a resistance of the connection based on the measured currents and the applied voltages, and then comparing the calculated resistance to a specified range of valid resistances to determine if a valid PD is detected. Thus, as part of configuring a device to act as a PD, a detection resistor may be added in the device's PoE reception circuitry, wherein the detection resistor has a predetermined resistance value that is designed to cause the resistance measured at the PSE during the detection process to be within the valid range. In contrast, a device that is not configured as a valid PD may lack such a resistor and thus when such a device is connected to the PSE the measured resistance will be outside the valid range.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

A device configured to operate as a PD generally contains a detection resistor in its PoE reception circuitry which is designed to allow the PSE to detect the device as a valid PD. However, it has been found that, in some circumstances, the PSE may measure a resistance that is outside the valid range notwithstanding the PD having a correctly configured detection resistor, resulting in the PSE not detecting the device as a valid PD. This failure to properly detect the PD means that PoE power will not be provided to the PD, which results in the PD either failing to power on (if no alternative power source is present) or losing power redundancy (if some alternative power source is present). In either case, the intended operation of the PD is disrupted, which can cause user frustration, unnecessary service calls, and/or unnecessary returns of the PD and/or PSE.

The inventors have identified that one possible cause of the PSE failing to properly detect a valid PD is that a DC voltage offset can sometimes appear in the PoE reception circuitry of the PD. In this context, DC voltage offset refers to portions of the reception circuitry of the PD having an unintended non-zero positive or negative voltage relative to the nominal zero voltage level of the PoE connection. As a result of this DC voltage offset, when the PSE applies the predetermined voltages to the conductors of the ethernet cable during the detection process, the effective voltage that appears across the detection resistor may be greater or lower than the predetermined voltage applied by the PSE (e.g., the DC offset may add to or subtract from the applied voltage), resulting in greater or lower current flowing through the resistor than would have been expected in the absence of the offset. The resistance value of the PD is determined by the PSE based on the measured current, and thus the increase or decrease in the current due to the DC offset causes the resistance value determined by the PSE to either be higher or lower than the nominal resistance (the nominal resistance being that which would be measured in the absence of the DC offset). If the absolute magnitude of the DC offset is large enough, the resistance measured at the PSE can be outside the specified range of valid resistances notwithstanding the resistance of the detection resistor being within the range of values. Thus, the DC offset in the PD can sometimes cause a failure to detect the PD.

The inventors have determined that such a DC voltage offset can arise due to AC noise appearing in the ethernet cable and/or in the PD reception circuit. This AC noise is converted into DC voltage by a DC rectifier (e.g., diode bridge) in the PD's PoE reception circuitry, and this DC voltage is accumulated and forms the DC voltage offset. Such AC noise may occur for a variety of reasons, but one common source of such noise is an adjacent cable (such as a power cord or another communication cable) which carries electrical signals that may induce the AC noise in the ethernet cable and/or in the PD's PoE reception circuitry.

To address the issues noted above, examples disclosed herein may prevent the occurrence of the DC voltage offset, or reduce its magnitude, thus reducing the likelihood that the PSE will erroneously fail to detect a valid PD. In some examples, the DC voltage offset is prevented or reduced by bypassing the AC noise that would otherwise create the DC voltage offset around the DC rectifier in the PD. In some examples, the AC noise may be bypassed around the DC rectifier using one or more bypass capacitors, from which the AC noise is ultimately passed to a ground conductor. In some examples, the AC noise is bypassed around the rectifier via a bypass capacitor which is connected in parallel to a rectifying element (e.g., diode, thyristor, etc.) of the rectifier. As a result of the AC noise bypassing the DC rectifier, the AC noise is not rectified by the rectifier into a DC voltage, and therefore the bypassed AC noise remains in AC form and does not produce a DC offset.

In particular, in some examples the DC rectifier comprises a diode bridge and the bypass capacitor is connected in parallel with a diode of the diode bridge between an input and an output of the diode bridge. This allows any AC noise appearing at the input of the diode bridge to be bypassed to the output of the bridge, via the bypass capacitor, without passing through the diodes and being rectified. From the output of the bridge, the bypassed AC noise can then be directed to a ground conductor via a second capacitor which is arranged in series between the output of the diode bridge and the ground conductor. This second capacitor may be present, for example, primarily to ensure Electromagnetic Compatibility (EMC) compliance, but may also serve as a convenient path to ground for the bypassed AC noise. Because the bypassed AC noise remains in AC form, it is not accumulated on the second capacitor but instead passes through the second capacitor to ground (capacitors accumulate DC signals but pass AC signals). In contrast, in systems without the bypass capacitor, the AC noise passes through and is rectified by the rectifier into a DC voltage, which is accumulated on the second capacitor, thus forming the DC offset.

Turning now to the figures, various devices, systems, and methods in accordance with aspects of the present disclosure will be described.

Figure 1:
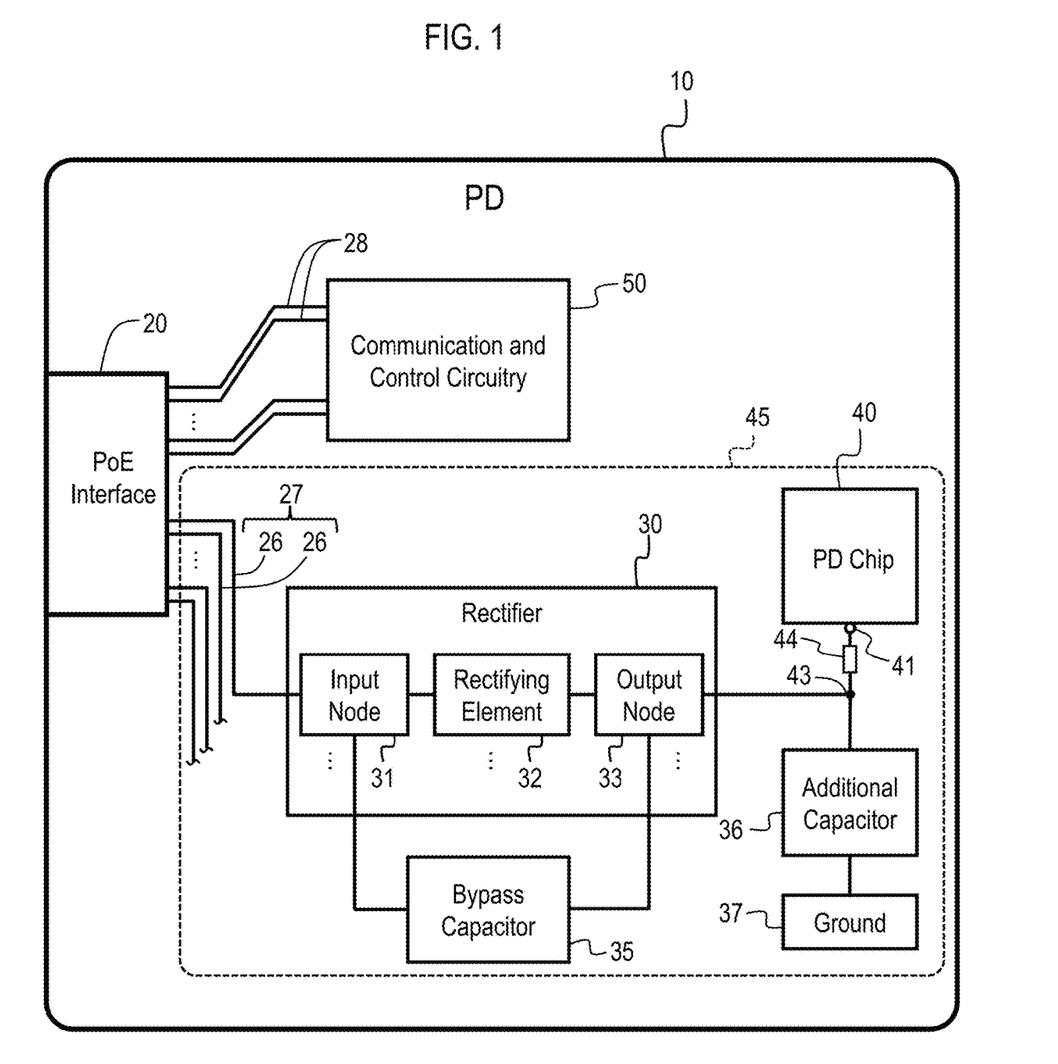
FIG. 1 is a block diagram illustrating an example PoE PD.

FIG. 1 is a block diagram conceptually illustrating a powered device ("PD") for use in a power-over-Ethernet ("PoE") system, in the form of PD 10. It should be understood that FIG. 1 is not intended to illustrate specific shapes, dimensions, or other structural details accurately or to scale, and that implementations of the PD 10 may have different numbers and arrangements of the illustrated components and may also include other parts that are not illustrated.

As shown in FIG. 1, the PD 10 comprises a PoE interface 20 to connect to an Ethernet cable, PoE reception circuitry 45 to receive and process PoE power signals from the PoE interface 20, and communication and control circuitry 50 to receive and process data signals from the PoE interface 20. The PoE reception circuitry 45 comprises, among other things, PD power circuitry 40 (e.g., a PD chip) to receive the PoE power signals and generate operating power signals for the other components of the PD 10. These and other components of the PD 10 will be described in turn below.

The PoE interface 20 comprises a port (not illustrated), such an RJ45 jack, configured to receive a connector of an ethernet cable, which may include an RJ45 connector. The PoE interface 20 is configured to receive both data and PoE power signals from the ethernet cable (in a state of the ethernet cable being connected between the PoE interface 20 and a PSE). Moreover, the PoE interface 20 may include circuitry (not illustrated) to receive and route the data and PoE power signals, such as electrical pins/contacts, transformers, switches, and/or other circuitry, as would be familiar to those of ordinary skill in the art. In particular, the PoE interface 20 is configured to direct the PoE power to power lines 26 and to direct the data signals to data lines 28. In some examples, each PoE power signal is a DC electrical signal comprising a relatively constant voltage applied between a pair 27 of the power lines 26, while each data signal comprises a differential signal comprising two alternating signals which have opposite polarities relative to one another and which are applied to a pair of the data lines 28. In FIG. 1 one PoE interface 20 is shown, but any number of PoE interfaces 20 equal to or greater than one may be included in the PD 10. PoE interfaces are familiar to those of ordinary skill in the art, and thus the PoE interface 20 is not described in greater detail herein.

As noted above, the PD 10 also comprises PoE reception circuitry 45 connected to the PoE interface 20. The PoE reception circuitry 45 comprises the power lines 26, one or more rectifiers 30, one or more bypass capacitors 35 (also referred to as "first capacitor 35"), an additional capacitor 36 (also referred to as "second capacitor 36"), a ground conductor 37, and the PD power circuitry. In some examples, a detection resistor 44 may also be disposed in the current path of the PoE power at any desired location in the PoE reception circuitry 45 through which the PoE power flows, such as in series between node 43 and input terminal 41 of the PD power circuitry 40 as illustrated in FIG. 1. The aforementioned components of the PoE reception circuitry 45 will be described in turn in greater detail below.

As noted above, each PoE power signal is applied to a pair 27 of the power lines 26, with one power line 26 having a relatively larger electrical potential and the other power line 26 of the pair 27 having a relatively smaller potential, thus forming a voltage differential across the pair 27 of power lines 26. The power line 26 having the larger potential may be referred to as the "hot" or "supply" or "positive" line of the pair 27 and the other power line 26 of the pair 27 may be referred to as the "return" or "negative" line (in this context, positive and negative refer only to which potential is higher than the other, and do not imply that the respective potentials are positive or negative relative to a ground potential or relative any other reference potential). In general, there can be any number of such pairs 27 of power lines 26, but FIG. 1 only one pair 27 is labeled to simplify the drawings.

As shown in FIG. 1, the power lines 26 are connected to one or more rectifiers 30. Although FIG. 1 only shows one rectifier 30, in practice any number of rectifiers 30 may be present. For example, in some implementations each pair 27 of power lines 26 is connected to a different corresponding rectifier 30 (e.g., the "hot" and "return" power lines 26 of a given pair 27 are both connected to the same rectifier 30, but the power lines 26 of different pairs 27 are connected to different rectifiers 30).

Often rectifiers are used to convert AC signals into DC, but as noted above in the PD 10 the PoE power signals are generally already in DC form when applied to the power lines 26. Thus, rather than the rectifier(s) 30 serving the purpose of converting AC to DC, in some examples the rectifier(s) 30 are instead provided primarily to ensure that each of the PoE power signals has a desired voltage polarity when received at input terminals of the PD power circuitry 40. This function may be needed because, in some PoE systems, the polarity of the PoE power signals as applied to the power lines 26 are not necessarily fixed. In other words, a given PSE may apply the larger potential to a first power line 26 of a pair 27, making it the "hot" line, but then the same PSE or a different PSE may at a later time apply the smaller potential to the first power line 27 of the pair, making it the "return" line. Thus, the PD 10 cannot know in advance which power lines 26 will be "hot" and which will be "return." However, it may be desired under some circumstances for the input terminals of the PD power circuitry 40 to receive the PoE power signals with a single predetermined polarity (e.g., for the larger potential to always be received at a first predetermined node and for the smaller potential to always be received at a second predetermined node). Thus, to ensure that the PoE power signals have the desired predetermined polarity when received at the PD power circuitry 40, in some examples the rectifier(s) 30 are provided between the power lines 26 and the PD power circuitry 40 and they operate to cause the larger potential to always be electrically connected to a first node of the PD power circuitry 40 regardless of which power line 26 is the "hot" line and similarly to cause the lower potential to always be electrical connected to a second node of the PD power circuitry 40 regardless of which power line 26 is the "return" line.

Each rectifier 30 comprises one or more input nodes including a first input node 31 ("input 31"), one or more rectifying elements including a first rectifying element 32, and one or more output node including a first output node 33 ("output 33"). The rectifying elements may be any electrical component configured to allow current to flow in one direction while restricting current flow in the opposite direction. In other words, the rectifying element may have a relatively low resistance when a voltage is applied across it in one direction while having a relatively high resistance when the voltage is applied across it in the opposite direction. Non-limiting examples of such rectifying elements include a diode, a thyristor, a silicon-controlled-rectifier, or any other rectifying element known in the art.

Figure 3:
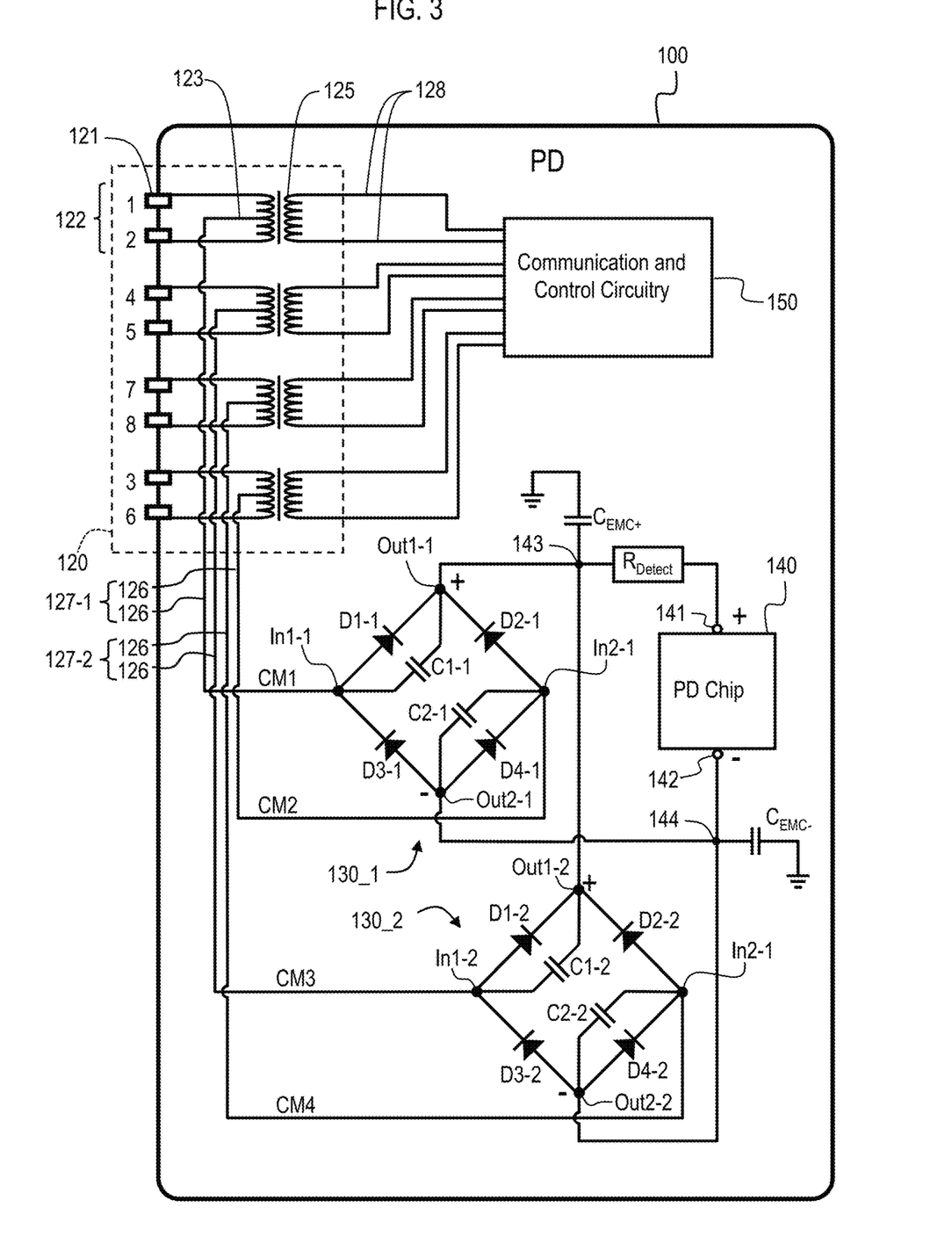
FIG. 3 is a schematic diagram illustrating another example PoE PD.

Although FIG. 1 illustrates only a single input node 31, a single rectifying element 32, and a single output 33, in various examples the rectifier(s) 30 may include more than one inputs, more than one rectifying elements, and/or more than one outputs. Moreover, while the connection of just a single power line 26 to the rectifier 30 is illustrated in FIG. 1, in practice multiple power lines 26 may be connected to the same rectifier 30. In particular, in some examples, both power lines 26 of a pair 27 are connected to the same rectifier 30 (e.g., a first power line 26 may be connected to a first input node 31, and a second power line 26 to a second input node (not illustrated)). The rectifier 30 may use any desired rectifier architecture, which may comprise various combinations of inputs, rectifying elements, and outputs, as would be familiar to those of ordinary skill in the art. A few non-limiting examples of rectifier architectures which may be used for the rectifier 30 include a half-wave rectifier, a full-wave rectifier (e.g., a diode bridge rectifier), a full-wave center tap rectifier; a three phase half-wave rectifier, and a three-phrase full-wave rectifier. For example, FIG. 3 illustrates a diode bridge rectifier 130, which is one example configuration of the rectifier 30.

As used herein "node" refers to a junction between current paths in a circuit. While such nodes are referred to herein separately from the other components, this does not necessarily imply physical separation, and in some implementations a node may be formed, in whole or in part, from a portion of another component. Furthermore, as used herein "input" and "output" are not intended to indicate a direction of current flow through the input and output nodes, but instead these terms refer to which side of the PoE reception circuitry 45 the respective nodes are connected to. In particular, each of the input nodes (including input 31) is a node of the rectifier 30 which is connected to one of the power lines 26, whereas each of the output nodes (including output 32) is a node of the rectifier 30 which is connected (directly or indirectly) to the PD power circuitry 40. The direction of current flowing through these nodes may vary depending on receiver architecture and on the polarity of PoE power signal applied to the power lines 26.

For example, in one implementation, the first rectifying element 32 is oriented so as to allow current to flow from first input node 31 to first output node 33. In such an example, if the power line 26 connected to the first input node 31 illustrated in FIG. 1 is the "hot" line, then when the PSE applies the PoE power signal to this pair 27 current will flow from the hot power line 26 to the first input node 31, from the first input node 31 through the first rectifying element 32 to the first output node 33, and then from the first output node 33 to the PD power circuitry 40. This current would then be returned to the other power line 26 of the pair 27 via another current path (not illustrated). For example, in one implementation the return current may pass from the PD power circuitry 40 to a second output node (not illustrated) and then through a second rectifying element (not illustrated) to a second input node (not illustrated). However, it should be understood that the currents may flow differently in other examples and/or in cases in which the polarity of the applied PoE power is reversed.

As another example, in another implementation, the first rectifying element 32 is oriented so as to allow current to flow from first output node 33 to first input node 31. In such an example, if the power line 26 connected to the first input node 31 illustrated in FIG. 1 is the "return" line, then when the PSE applies the PoE power signal to this pair 27, return current will flow from the PD power circuitry 40 to the first output node 33, from the output node 33 to the input node 31 via the rectifying element 32, and from the input node 31 to the "return" line 26. However, it should be understood that the currents may flow differently in other examples and/or in cases in which the polarity of the applied PoE power is reversed.

As noted above, the output node(s) 33 of the rectifier(s) 30 are connected, directly or indirectly, to input terminals of PD power circuitry 40. In FIG. 1, only one of these input terminals, i.e., input terminal 41, is illustrated for convenience, but in practice at least two input terminals (including the input terminal 41) may be present, one for being electrical connected to the larger potential carried on the "hot" power line 26 and one for being electrical connected to the lower potential carried on the "return" power line 26. The PD power circuitry 40 comprises circuitry configured to receive the PoE power from the rectifier 30 at the input terminals, process the PoE power, and provide operating power to the other components of the PD 10 based on the PoE power so as to power operations of the PD 10. Operating power, in this context, refers to the power supplied to and used by the various components of the PD 10 to facilitate their operation. In some cases the PD power circuit 40 may generate such operating power by converting the PoE power into other forms, for example by changing the voltage. In some cases, the PD power circuitry 40 may convert the PoE power signal into multiple different operating power signals to accommodate different power needs of different components. For example, in some implementations a 24V or 48V PoE power signal may be converted by the PD power circuitry 40 into 12V, 5V, and/or 3.3V operating power signals. In some examples, the PD power circuitry 40 comprises a microchip configured to perform and/or control the provisioning of the operating power based on the PoE power, and such a microchip may be referred to in the art as a PD chip, PD integrated circuitry (IC), PD controller, PoE chip, PoE IC, PoE microcontroller, or other similar terms. The PD power circuitry 40 may also perform various other operations associated with controlling the provisioning of the PoE power to the remainder of the PD 10, such as responding to the PSE as part of a PD classification operation which the PSE performs to classify the PD after successful detection thereof, powering up the PD 10 including inrush control, and/or measuring power consumption. In some examples, the detection resistor $R_{Detect}$ is also part of the PD power circuitry 40, in which case the PD power circuitry 40 also participates in the PD detection process.

As shown in FIG. 1, the PoE reception circuitry 45 also comprises an additional capacitor 36 connected in-series between the output node 33 and a ground conductor 37 ("ground 37"). The additional capacitor 36 is also connected in-series between the PD power circuitry 40 and the ground 37. In other words, the additional capacitor 36 is connected in-series between the node 43 and the ground 37, wherein the node 43 is connected to both the output node 33 and the terminal 41 of PD power circuitry 40. In some examples, the additional capacitor 36 may be provided for EMC compliance—for example, the additional capacitor 36 may reduce electromagnetic interference (EMI) between the PD 10 and the external environment.

In some examples, the PoE reception circuitry 45 also comprises a detection resistor 44 disposed in series between the output node 33 and the PD power circuitry 40 (e.g., in series between node 43 and terminal 41). The detection resistor 44 may have a predetermined resistance which is designed to allow for detection of the PD 10 by a PSE when the PSE performs a detection process as described above. In particular, the detection resistor has a resistance that falls within a valid range of resistances used by PSE when detecting PDs, which in some systems is 17 k$\Omega$ to 29 k$\Omega$. In some examples, the resistance of the detection resistor 44 may fall within a range that is somewhat narrower than the aforementioned valid range of resistances used by PSE, such as a range of 19 k$\Omega$ to 27 k$\Omega$ in some examples. More specifically, in some examples, the detection resistor 44 has a resistance of about 25 k$\Omega$±5%. Note that the detection resistor 44 is not necessarily present between each output node and the PD power circuitry 40, and in some examples, the detection resistor 44 might not be present between the first output node 33 and the PD power circuitry 40. In some examples, the detection resistor 44 is optional. In some examples, the detection resistor 44 may be included within the PD power circuitry 40 (for example, within a PD chip that makes up the PD power circuit 40) rather than being provided as a separate component.

The PoE reception circuitry 45 also comprises one or more bypass capacitors including first bypass capacitor 35 (also referred to as "first capacitor"). In FIG. 1, only one bypass capacitor is illustrated, but any number of such bypass capacitors may be provided. The first bypass capacitor 35 is connected in parallel to the first rectifying element 32 between the first input node 31 and the first output node 33. In other words, the first bypass capacitor 35 is connected between the first input node 31 and the first output node 33, with the first bypass capacitor 35 and the first rectifying element 32 forming (or being part of) two alternative paths extending in parallel between the first input node 31 and the first output node 33. More generally, references herein such as "A is connected in-parallel to B between X and Y" or "A and B are connected in-parallel between X and Y" should be understood as meaning that components A and B are both connected to components X and Y so as to form two alternative parallel paths between X and Y, including a first path comprising A connected between X and Y (e.g., X-A-Y) and a second path comprising B connected between X and Y (e.g., X-B-Y). As used herein, "parallel" is used in the electrical circuitry sense of the term, not in the geometric sense of the term, unless explicitly indicated otherwise or required by the context.

Figure 2:
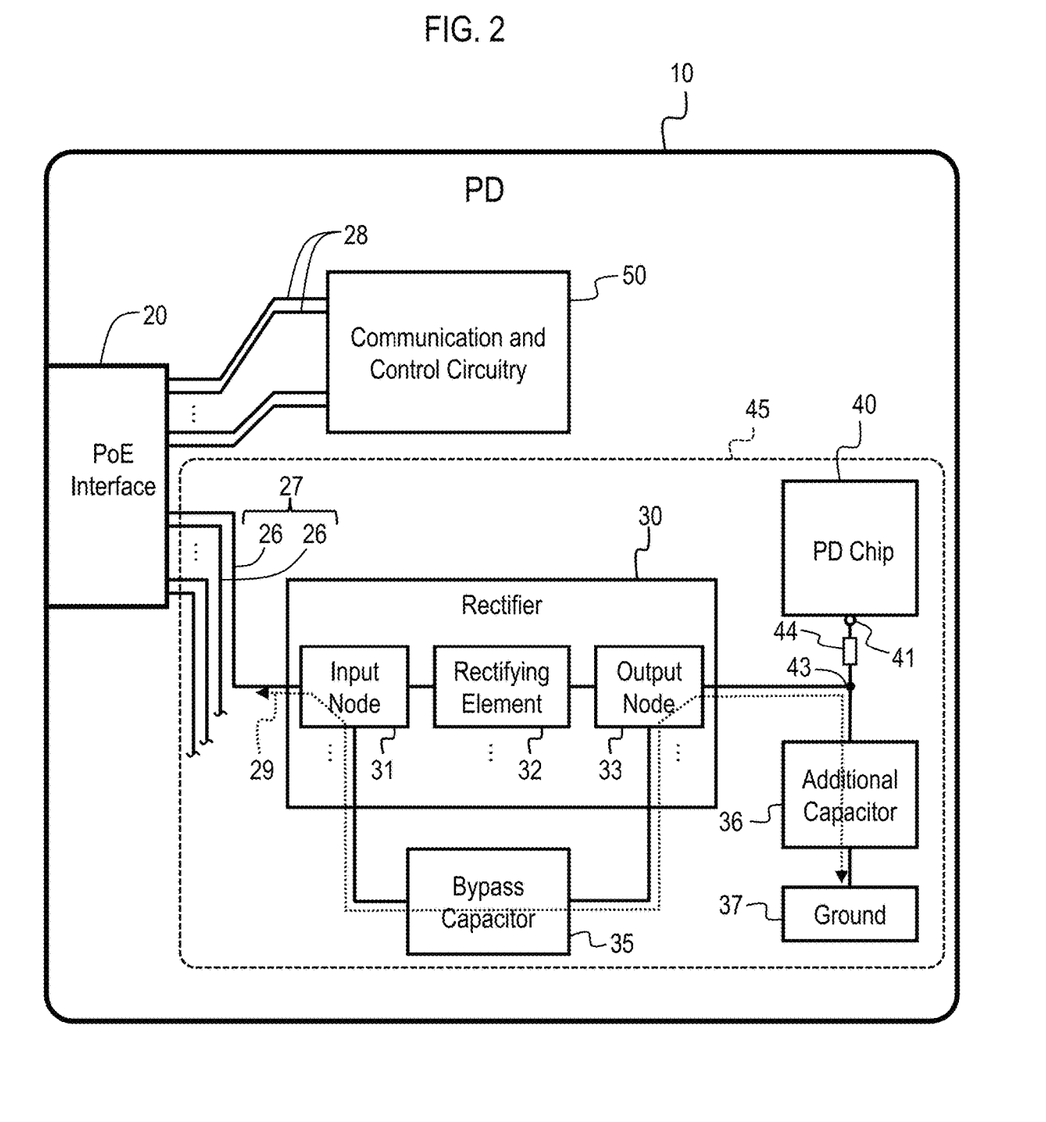
FIG. 2 is block diagram illustrating the PD of FIG. 1 in a state with AC noise on a power line.

As described above, the bypass capacitor 35 (and any other bypass capacitors, if present) is (are) provided in order to bypass AC noise which may appear on the power lines 26 or on other portions of the PoE reception circuitry 45. For example, FIG. 2 illustrates the PD 10 in a state in which AC noise 29 has developed on the power line 26 which is connected to the first input node 31. As shown in FIG. 2, when such AC noise arises, the bypass capacitor 35 provides a path through which the AC noise 29 can bypass the rectifier 30. As indicated by the dotted line in FIG. 2, the AC noise 29 can flow between the power line 26 and the ground conductor 37 via a path flowing through the first bypass capacitor and the additional capacitor 36. The AC noise 29 can flow through the capacitors 35 and 36 because capacitors pass AC signals, but the DC PoE signals applied to the power lines 26 do not pass through the bypass capacitor 35 because capacitors block DC signals. Thus, the bypass capacitors 35 do not interfere with the intended functioning of the rectifier 30 with respect to the PoE signals. Because the AC noise 29 is bypassed to ground 37 via the bypass capacitor 35, the AC noise 29 does not get rectified by the rectifying element 32 into a DC offset. Accordingly, the issue described above of a PD not being detected by a PSE due to a DC offset accumulating at the PD power circuitry 40 can be avoided, thus increasing the likelihood that the PD 10 is properly detected. Thus, the reliability of the PD 10 can be improved and unnecessary repair calls and/or product returns can be avoided or reduced.

In examples in which the rectifier 30 includes additional inputs, outputs, and/or rectifying elements, additional bypass capacitors may also be provided. In particular, in some examples, a bypass capacitor may be provided for each input of the rectifier. For example, if the rectifier has two inputs connected to two of the power lines 26, respectively, then in some implementations two bypass capacitor may be provided to bypass AC noise from both power lines 26: e.g., a first bypass capacitor connected between a first input and a first output, and a second bypass capacitor connected between a second input and a second output. FIGS. 3-7 illustrate one such example implementation, which will be described in greater detail below.

The PD also comprises communication and control circuitry 50. The communication and control circuitry 50 is connected to the data lines 28 and is configured to receive, apply, route, and/or process the data signals communicated over the data lines 28. In some examples, the communication and control circuitry 50 may comprise an Ethernet PHY chip, which handles the translations between physical layer Ethernet communications and higher-level communication signals communicated with other portions of the circuitry 50 (such as a CPU) or other portions of the PD 10. In some examples, the PD 10 is configured to have switching and/or routing capabilities, and the communication and control circuitry 50 may include switching circuitry (e.g., a switching crossbar, a switching ASIC, etc.) configured to switchably connect the data lines 28 to other communications interfaces (e.g., other ports) to allow communications to flow between these interfaces. In some examples, the communication and control circuitry 50 may comprise processing circuitry configured to control various operations of the PD 10, such as a processor, system-on-chip (SoC), ASIC, or other processing circuitry.

Turning now to FIGS. 3-7, an example PD 100 will be described. The PD 100 is one example implementation of the PD 10 described above, and thus certain components of the PD 100 correspond to (i.e., are the same as or are an example implementation of) components of the PD 10. The descriptions above of components of the PD 10 are also applicable, mutatis mutandis, to corresponding components of the PD 100, and duplication of such descriptions is omitted below. Although the PD 100 is one example implementation of the PD 10, the PD 10 may include other implementation examples and is not limited to the PD 100.

As shown in FIG. 3, the PD 100 comprises a PoE interface 120, which is an example implementation of the PoE interface 20. The PD 100 also comprises PoE reception circuitry 145, which is an example implementation of the PoE reception circuitry 45; the PoE reception circuitry 145 comprises rectifiers 130 and a PD chip 140, which are example implementations of the rectifier 30 and PD power circuitry 40, respectively. These and other components of the PD 100 will be described in turn below.

The PoE interface 120 comprises a port (e.g., RJ45 jack) which comprises a plurality of electrical contacts 121 configured to electrically connect with complementary contacts of a connector of an Ethernet cable plugged into the port of the PoE interface 20. The contacts 121 are grouped into pairs 122, with each pair 122 having one differential signal pair applied thereto. That is, one contact 121 of a pair 122 carries one of the alternating signals that makes up a differential signal pair, while the other contact 121 of the same pair 122 carries the other alternating signal that makes up the differential signal pair. In some examples, the PoE interface 120 comprises eight of the contacts 121 arranged into four pairs 122. The contacts 121 are conventionally numbered 1 through 8, with pairings between these contacts 121 being as shown in FIG. 3.

The two contacts 121 of a given pair 122 are connected to a corresponding pair of data lines 128 via a transformer 126. The transformer 126 passes the differential signal pair carried by the pair 122 to the data lines 128 while also providing electrical isolation therebetween for safety. The differential signal pair comprises data communications encoded in the alternation of the signals, as would be familiar to those of ordinary skill in the art. The two contacts 121 of a pair 122 are connected to opposite ends of the same winding of the transformer 126.

In addition to encoding data communications, some of the differential signal pairs may also carry PoE power signals. These PoE power signals may be extracted from the differential signal pairs via center taps 123 of the transformers 125. The power lines 126 are each connected to one of the center taps 123 of a corresponding one of the transformers 125. Specifically, the power line 126 labeled CM1 is connected to the center tap 123 of the 1,2 contact pair 122, the power line 126 labeled CM2 is connected to the center tap 123 of the 3, 6 contact pair 122, the power line 126 labeled CM3 is connected to the center tap 123 of the 4, 5, contact pair 122, and the power line 126 labeled CM4 is connected to the center tap 123 of the 7, 8, contact pair 122. In some examples, to supply the PoE power signals, the PSE shifts a central voltage of one of the differential signal pairs relative to the central voltage of another one of the differential signal pairs, which results in one of the center taps 123 having a greater electrical potential than another one of the center taps, which results in a DC voltage difference being applied between a pair 127 of the power lines 126. This DC voltage difference between a pair 127 of the power lines 126 forms a PoE power signal.

For example, if the PSE sets the central voltage of the differential signal pair applied to the 1, 2 contact pair 122 to a potential $V_A$ while setting the central voltage of the differential signal pair applied to the 3, 6 contact pair 122 to a potential $V_B$, then the potential $V_A$ will be applied to the power line 126 labeled CM1 while the potential $V_B$ will be applied to the power line 126 labeled CM2. Consequently, a voltage difference of $V_C=V_A-V_B$ will be applied between the power lines 126 labeled CM1 and CM2, which form a first power line pair 127-1. Thus, if $V_A$ is greater than $V_B$, then CM1 will be the "hot" power line 126 of the pair 127-1 and CM2 will be the "return" power line 126 of the pair 127-1. Conversely, if $V_A$ is less than $V_B$, then CM1 will be the "return" power line 126 of the pair 127-1 and CM2 will be the "hot" power line 126 of the pair 127-1.

Alternatively, the PSE may choose to supply the PSE power signals via the differential signal pairs applied to the 4,5 and 7,8 contact pairs, which would result in a DC voltage difference between the power lines 126 labeled CM3 and CM4, which form a second power line pair 127-2.

As shown in FIG. 3, the PD 100 also comprises two rectifiers 130, namely a first rectifier 130-1 and a second rectifier 130-2. Each rectifier 130 is an example implementation of the rectifier 30 described above. The first rectifier 130-1 is connected to the first power line pair 127-1 (i.e., to power lines 126 CM1 and CM2), whereas the second rectifier 130-2 is connected to the second power line pair 127-2 (i.e., to power lines 126 CM3 and CM4). The rectifiers 130 each use diodes as the rectifying elements and comprise a diode bridge.

In particular, the first rectifier 130-1 comprises a first input node In1-1 connected to power line 126 CM1, a second input node In1-2 connected to power line 126 CM2, a first output node Out1-1 connected to a positive terminal 141 of PD chip 141 via node 143, a second output node Out1-2 connected to a negative terminal 142 of PD chip 141 via node 144, a first diode D1-1 arranged to allow current to flow from first input node In1-1 to the first output node Out1-1, a second diode D2-1 arranged to allow current to flow from second input node In2-1 to the first output node Out1-1, a third diode D3-1 arranged to allow current to flow from second output node Out2-1 to the first input node In1-1, and a fourth diode D4-1 arranged to allow current to flow from second output node Out2-1 to the second input node In2-1. Thus, if CM1 is the "hot" power line 126, then current will flow from CM1 to the positive terminal 141 of PD chip 140 via In1-1, D1-1, Out1-1, node 143, and $R_{Detect}$, and the current will be returned from the negative terminal 142 of PD chip 140 to CM2 via node 144, Out2-1, D4-1, and In2-1. On the other hand, if CM2 is the "hot" power line 126, then current will flow from CM2 to the positive terminal 141 of PD chip 140 via In2-1, D2-1, Out1-1, node 143, and $R_{Detect}$, and the current will be returned from the negative terminal 142 of PD chip 140 to CM1 via node 144, Out2-1, D3-1, and In1-1.

The second rectifier 130-2 is similar to the first rectifier 130-1 except for being connected to the power lines 126 CM3 and CM4 instead of the power lines 126 CM1 and CM2. The components of the second rectifier 130-2 are the same as the above-described components of the first rectifier 130-1 and thus have similar reference numbers in FIG. 3, except that the reference numbers for the components of the first rectifier 130-1 have a "−1" appended thereto whereas the reference numbers for the components of the second rectifier 130-2 have a "-2" appended thereto.

The input nodes In1-1, In2-1, In1-2, and In2-2 are example implementations of the input nodes of the PD 10, including the first input node 31. The output nodes Out1-1, Out2-1, Out1-2, and Out2-2 are example implementations of the output nodes of the PD 10, including the first output node 33. The diodes D1-1, D2-1, D3-1, D4-1, D1-2, D2-2, D3-2, and D4-2 are example implementations of the rectifying elements of the PD 10, including the first rectifying element 32. In various other examples of the PD 100 (not illustrated), the architecture shown in FIG. 3 is used except that the didoes are replaced with alternative rectifying elements, such as thyristors, silicon-controlled-rectifiers, or any other rectifying elements known in the art.

The detection resistor $R_{Detect}$ is used for PD detection, as already described above. Although illustrated separately to aid understanding, in some examples the detection resistor $R_{Detect}$ is provided as an integrated component of the PD chip 140, in which case, the detection resistor $R_{Detect}$ would be arranged in a current path flowing from terminal 141 to terminal 142 so that the current flowing through PD chip 140 still passes through detection resistor $R_{Detect}$.

In addition, the PD 100 comprises EMC capacitors $C_{EMC+}$ and $C_{EMC-}$. These EMC capacitors are example implementations of the additional capacitor 36 described above.

Moreover the PD 100 comprises bypass capacitors C1-1, C2-1, C1-2, and C2-2, which are example implementations of the bypass capacitors of the PD 10, including the first bypass capacitor 35. Each of the bypass capacitors C1-1, C2-1, C1-2, and C2-2 is configured to bypass AC noise from a corresponding one of the power lines 126 to a ground conductor (which may be a system reference ground, an enclosure ground, or an earth ground).

Figure 4:
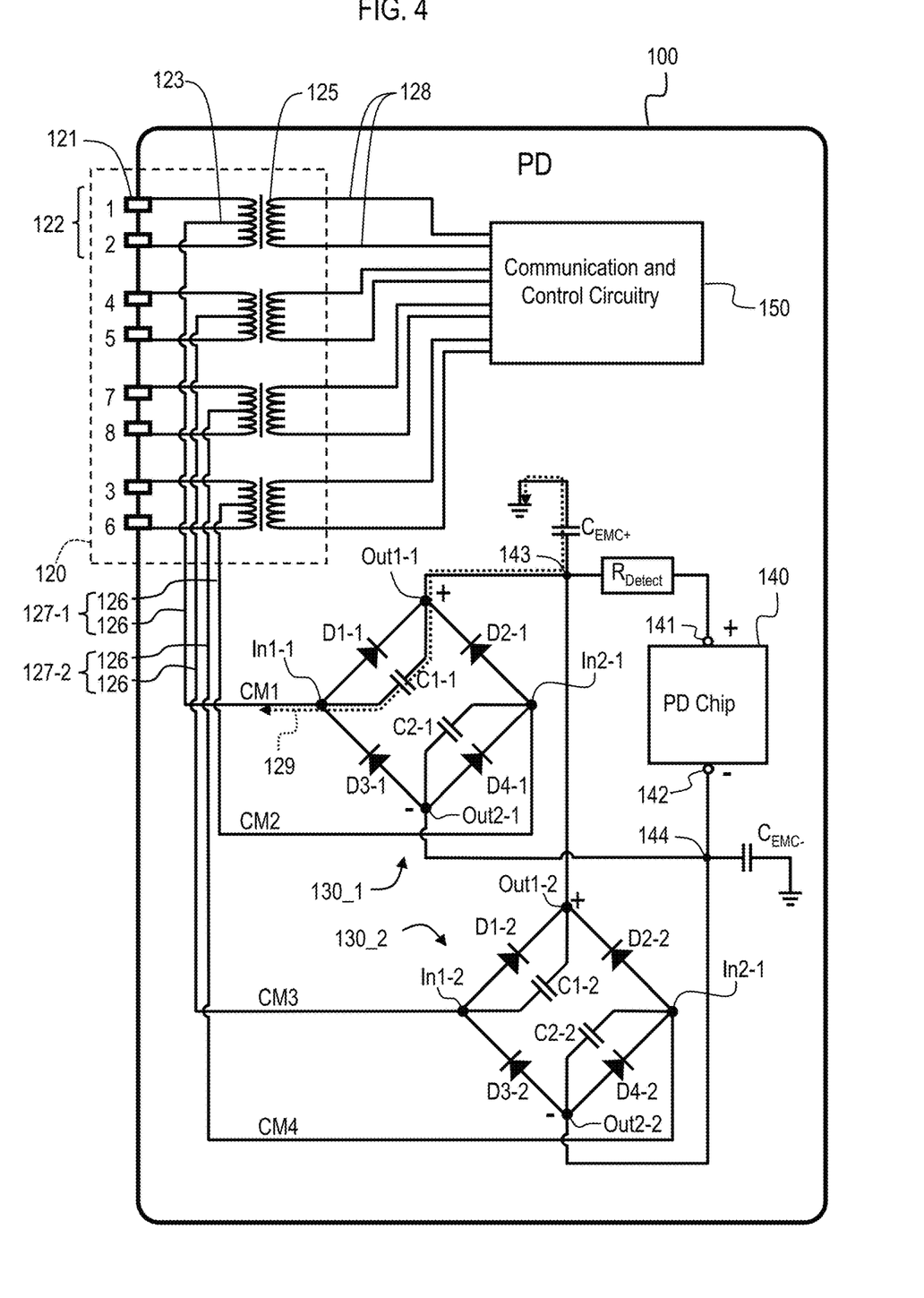
FIG. 4 is a schematic diagram illustrating the PD of FIG. 3 in a state with AC noise on a first power line.

Specifically, the bypass capacitor C1-1 is connected in-parallel to the diode D1-1 between the input node In1-1 and the output node Out1-1. Thus, as shown in FIG. 4, AC noise 129 appearing on the power line 126 CM1 is bypassed to ground via the bypass capacitor C1-1 (passing through the EMC capacitor $C_{EMC+}$ along the way).

Figure 5:
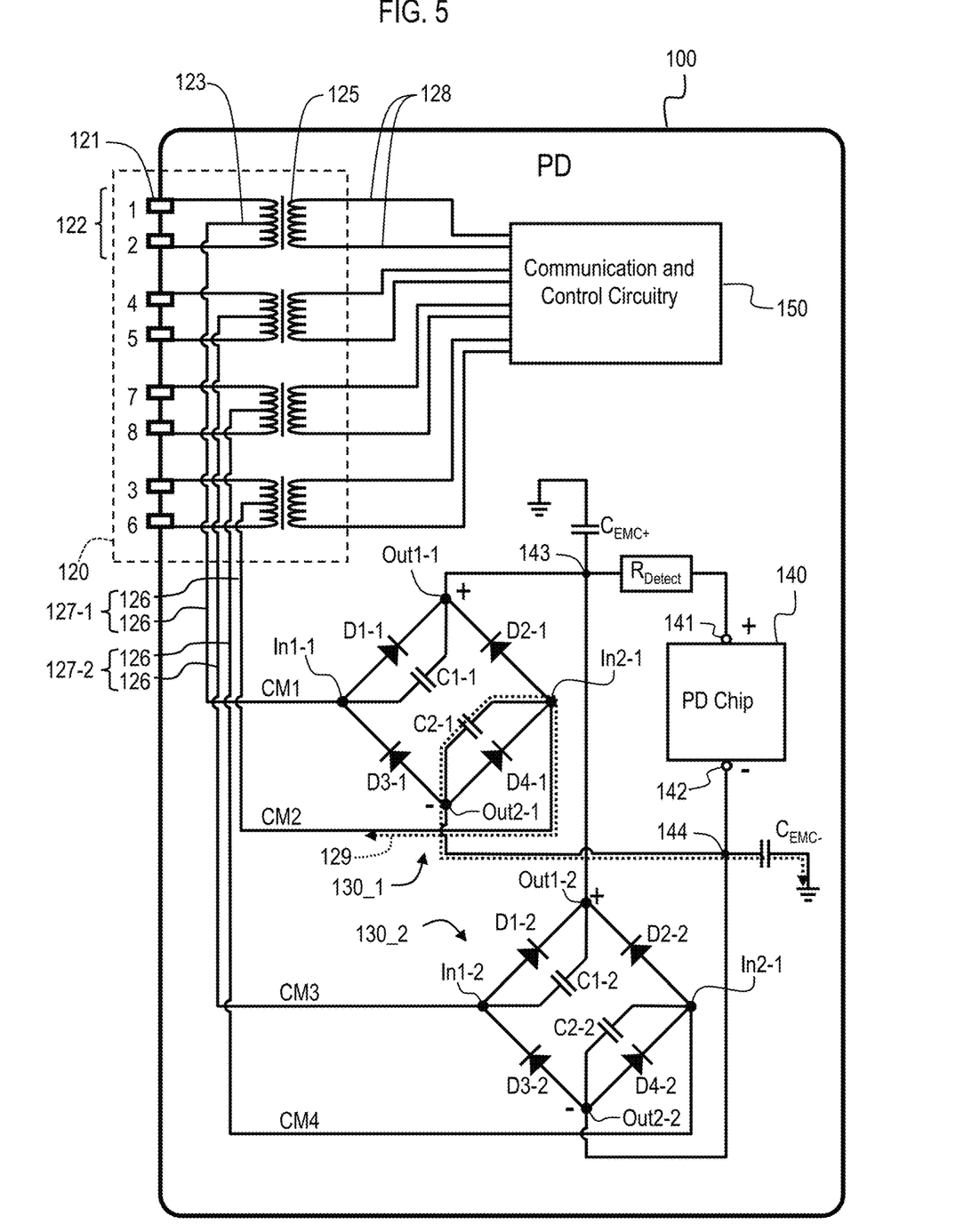
FIG. 5 is a schematic diagram illustrating the PD of FIG. 3 in a state with AC noise on a second power line.

Similarly, the bypass capacitor C2-1 is connected in-parallel to the diode D4-1 between the input node In2-1 and the output node Out2-1. Thus, as shown in FIG. 5, AC noise 129 appearing on the power line 126 CM2 is bypassed to ground via the bypass capacitor C2-1 (passing through the EMC capacitor $C_{EMC-}$ along the way).

Figure 6:
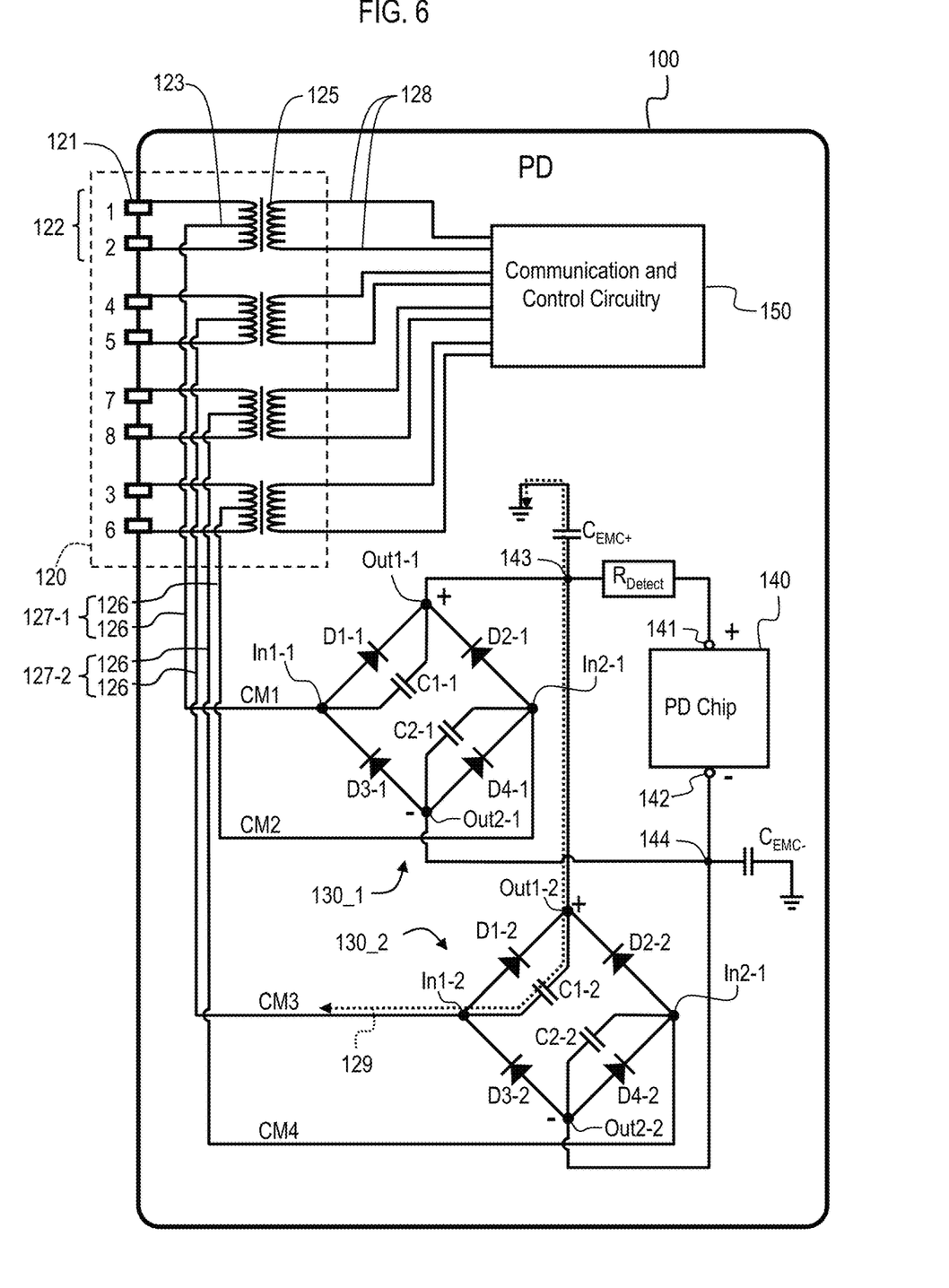
FIG. 6 is a schematic diagram illustrating the PD of FIG. 3 in a state with AC noise on a third power line

Furthermore, the bypass capacitor C1-2 is connected in-parallel to the diode D1-2 between the input node In1-2 and the output node Out1-2. Thus, as shown in FIG. 6, AC noise 129 appearing on the power line 126 CM3 is bypassed to ground via the bypass capacitor C1-2 (passing through the EMC capacitor $C_{EMC+}$ along the way).

Figure 7:
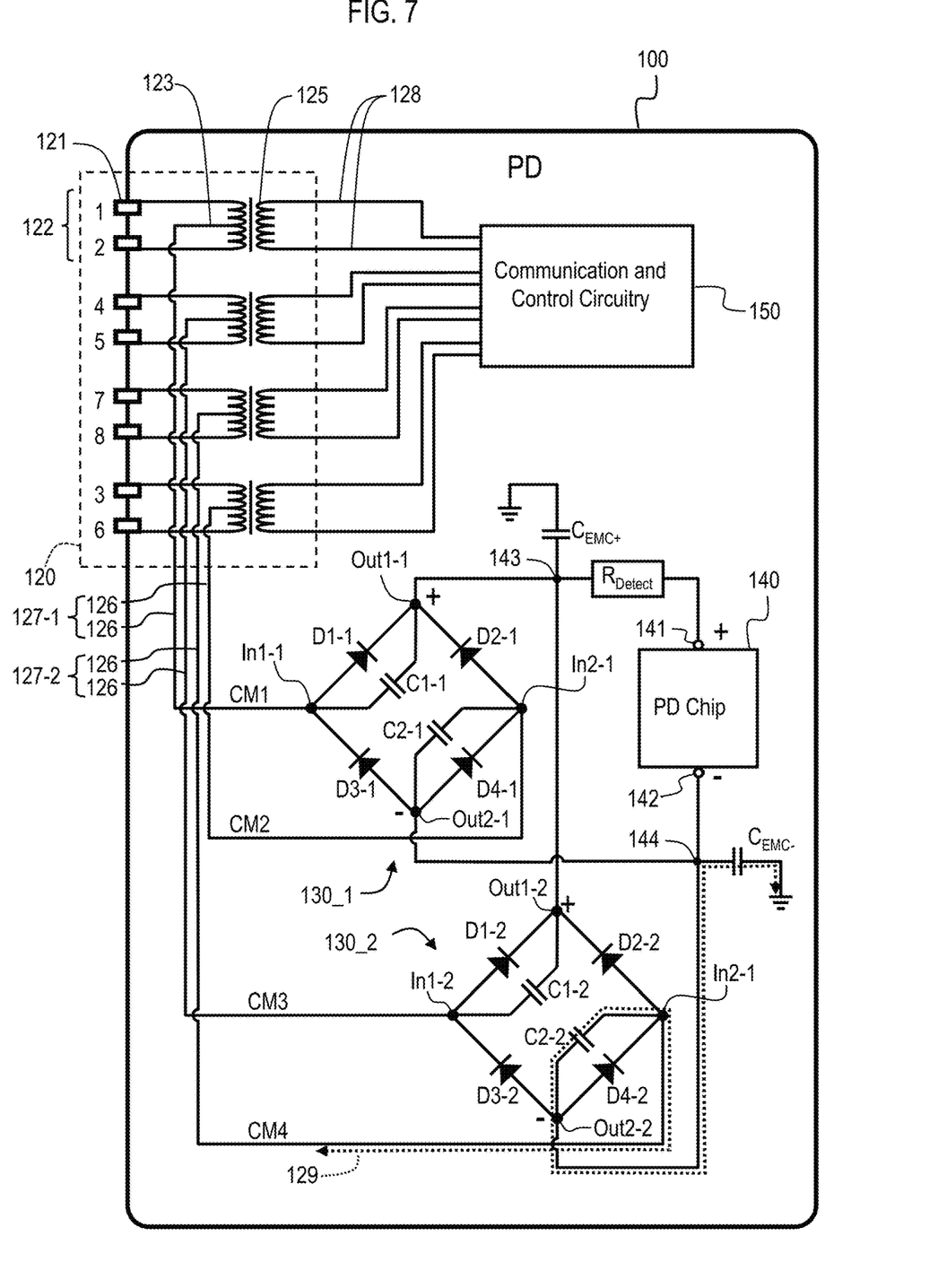
FIG. 7 is a schematic diagram illustrating the PD of FIG. 3 in a state with AC noise on a fourth power line.

Finally, the bypass capacitor C2-2 is connected in-parallel to the diode D4-2 between the input node In2-2 and the output node Out2-2. Thus, as shown in FIG. 7, AC noise 129 appearing on the power line 126 CM4 is bypassed to ground via the bypass capacitor C2-2 (passing through the EMC capacitor $C_{EMC-}$ along the way).

As a result of the bypass capacitors C1-1, C2-1, C1-2, and C2-2 bypassing the AC noise around the rectifying elements of the rectifiers 130 to ground, a DC offset does not accumulate on the EMC capacitors $C_{EMC+}$ or $C_{EMC-}$ due to the AC noise, and therefore the issue described above of such a DC offset preventing detection of the PD may be avoided or made less likely.

As noted above, the PD 100 also comprises PD chip 140. The PD chip 140 may comprise a microchip/microcontroller/integrated circuit configured to perform the operations described above in relation to the PD power circuitry 40.

The PD 100 also comprises communication and control circuitry 150, which is similar to the communication and control circuitry 50 described above.

Figure 8:
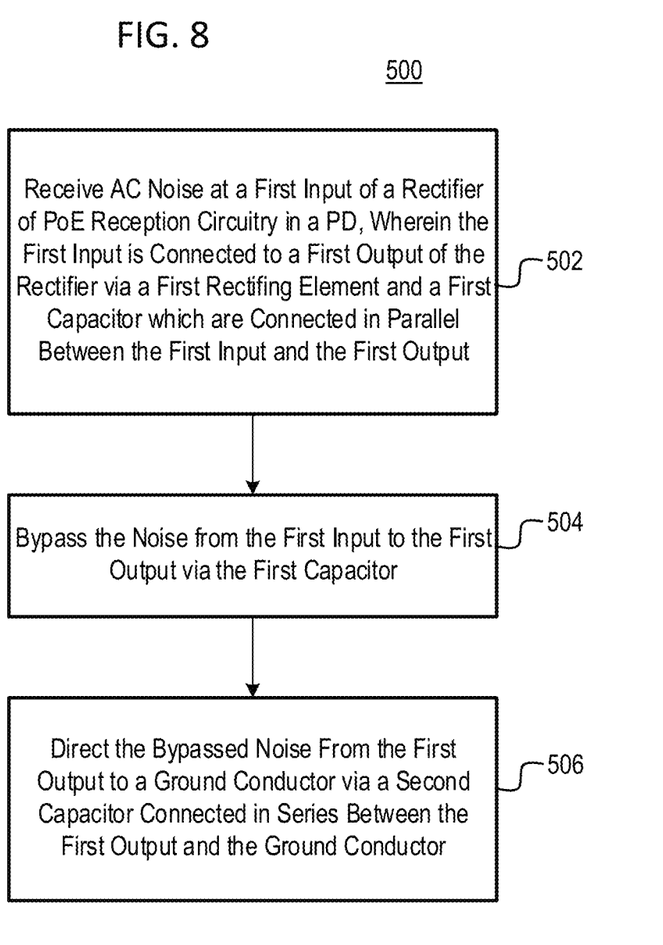
FIG. 8 is a process flow diagram illustrating an example method.

Turning now to FIG. 8, a method 500 will be described. As shown in FIG. 4, the method 500 comprises operations of blocks 502, 504, and 506, which are described in greater detail below. The method 500 may be preformed by a PD, such as the PD 10 or PD 100 described above, or by a person using such a PD.

In block 502, the PD receives AC noise at a first input node of a rectifier of PoE reception circuitry of the PD (such as rectifiers 30, 130-1, or 130-2). The first input node (e.g., input 31 or any of input nodes In1-1, In2-1, In1-2, and In2-2) is connected to a first output node (e.g., output 33 or any of output nodes Out1-1, Out 2-1, Out 1-2, and Out 2-2) of the rectifier via a first rectifying element (such as rectifying element 32 or any of diodes D1-1, D2-1, D1-2, and D2-2). In addition, the first input node is connected to the first output node by a first capacitor (such as bypass capacitor 35 or any of bypass capacitors C1-1, C2-1, C1-2, and C2-2). The rectifying element and the first capacitor are connected in-parallel between the first input node and the first output node.

In block 504, the PD bypasses the AC noise from the first input node to the first output node via the first capacitor.

In block 506, the PD directs the bypassed AC noise from the first output node to a ground conductor via a second capacitor (e.g., additional capacitor 36 or any of the EMC capacitors $C_{EMC+}$ and $C_{EMC-}$) which is connected in series between the first output node and the ground conductor.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as connected may be electronically or mechanically directly connected, or they may be indirectly connected via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A power-over-Ethernet (POE) powered device (PD), comprising:
    a PoE interface configured to removably receive a connector of an ethernet cable to communicably connect the PD to a PoE power sourcing equipment (PSE);
    a first power line connected to the PoE interface to receive PoE power from the PSE in a connected state of the PD to the PSE;
    PD power circuitry;
    a rectifier comprising a first input connected to the first power line, a first output connected to a first terminal of the PD power circuitry, and a first rectifying element connected between the first input and the first output;
    a first capacitor connected in parallel to the first rectifying element between the first input and the first output, wherein AC noise appearing on the first power line is bypassed around the first rectifying element via the first capacitor; and
    a second capacitor connected in series between the first output and a ground conductor, wherein the AC noise bypassed to the first output is directed from the first output to the ground conductor via the second capacitor.

2. The PD of claim 1, comprising:
    a second power line connected to the PoE interface to receive PoE power from the PSE in the connected state of the PD to the PSE;
    wherein the rectifier comprises:
        a second input connected to the second power line;
        a second output connected to a second terminal of the PD power circuitry;
        a second rectifying element connected between the second input and the first output;
        a third rectifying element connected between the first input and the second output; and
        a fourth rectifying element connected between the second input and the second output.

3. The PD of claim 2, comprising:
    a third capacitor connected in parallel to the fourth rectifying element between the second input and the second output, wherein AC noise appearing on the second power line is bypassed around the fourth rectifying element via the third capacitor.

4. The PD of claim 3, comprising:
    a fourth capacitor connected in series between the second output and the ground conductor, wherein the AC noise bypassed to the second output is directed from the second output to the ground conductor via the fourth capacitor.

5. The PD of claim 2,
    wherein the rectifier comprises a diode bridge and the first, second, third, and fourth rectifying elements comprise diodes.

6. The PD of claim 2, comprising:
    a third power line and a fourth power line, each connected to the PoE interface to receive PoE power from the PSE in the connected state of the PD to the PSE;
    a second rectifier connected to the third and fourth power lines and to the PD power circuitry.

7. The PD of claim 6,
    wherein the second rectifier comprises a third input connected to the third power line, a third output connected to the first terminal of the PD power circuitry, and a fifth rectifying element connected between the third input and the third output; and wherein the PD comprises a fifth capacitor connected in parallel to the fifth rectifying element between the third input and the third output, wherein AC noise appearing on the third power line is bypassed around the fifth rectifying element via the fifth capacitor.

8. The PD of claim 7,
wherein the second rectifier comprises:
a fourth input connected to the fourth power line;
a fourth output connected to the second terminal of the PD power circuitry;
a sixth rectifying element connected between the fourth input and the third output;
a seventh rectifying element connected between the third input and the fourth output; and
an eighth rectifying element connected between the fourth input and the fourth output.

9. The PD of claim 8, comprising:
a sixth capacitor connected in parallel to the eighth rectifying element between the fourth input and the fourth output, wherein AC noise appearing on the fourth power line is bypassed around the eighth rectifying element via the sixth capacitor.

10. The PD of claim 1, comprising:
wherein the PD power circuitry is configured to receive the PoE power from the first power line via the rectifier and supply operating power to other components of the PD based on the PoE power.

11. The PD of claim 1,
wherein the first rectifying element comprise a diode.

12. A power-over-Ethernet (POE) powered device (PD), comprising:
a PoE interface configured to removably receive a connector of an ethernet cable to communicably connect the PD to a PoE power sourcing equipment (PSE), the PoE port comprising a first pair of electrical connectors and a second pair of electrical connectors;
a first power line connected to the first pair of electrical connectors and a second power line connected to the second pair of electrical connectors such that differential signals applied by the PSE to the first and second pairs of electrical connectors apply a DC voltage between the first and second power lines;
a PD chip having a first terminal and a second terminal;
a diode bridge rectifier comprising:
a first input connected to the first power line, a first output connected to the first terminal, and a first diode connected to allow current from the first input to the first output; and
a second input connected to the second power line, a second output connected to the second terminal, and a second diode connected to allow current from the second input to the second output;
a first bypassing capacitor connected in-parallel to the first diode between the first input and the first output, wherein AC noise appearing on the first power line is bypassed around the first diode via the first bypassing capacitor; and
a second bypassing capacitor connected in-parallel to the second diode between the second input and the second output, wherein AC noise appearing on the second power line is bypassed around the second diode via the second bypassing capacitor.

13. The PD of claim 12, comprising:
a first electromagnetic compatibility (EMC) capacitor connected in series between the first output and a ground conductor, wherein the AC noise bypassed to the first output is directed from the first output to the ground conductor via the first EMC capacitor; and
a second electromagnetic compatibility (EMC) capacitor connected in series between the second output and the ground conductor, wherein the AC noise bypassed to the second output is directed from the second output to the ground conductor via the second EMC capacitor.

14. The PD of claim 12, comprising:
a third power line connected to a third pair of electrical connectors and a fourth power line connected to a fourth pair of electrical connectors such that differential signals applied by the PSE to the third and fourth pairs of electrical connectors apply a DC voltage between the third and fourth power lines;
a second diode bridge rectifier comprising:
a third input connected to the third power line, a third output connected to the first terminal, and a third diode connected to allow current from the third input to the third output; and
a fourth input connected to the fourth power line, a fourth output connected to the second terminal, and a fourth diode connected to allow current from the fourth input to the fourth output;
a third bypassing capacitor connected in-parallel to the third diode between the third input and the third output, wherein AC noise appearing on the third power line is bypassed around the third diode via the third bypassing capacitor; and
a fourth bypassing capacitor connected in-parallel to the fourth diode between the fourth input and the fourth output, wherein AC noise appearing on the fourth power line is bypassed around the fourth diode via the fourth bypassing capacitor.

15. The PD of claim 14, comprising:
a first electromagnetic compatibility (EMC) capacitor connected in series between the first output and a ground conductor and connected in series between the third output and the ground conductor, wherein the AC noise bypassed to the first output is directed from the first output to the ground conductor via the first EMC capacitor and AC noise bypassed to the third output is directed from the third output to the ground conductor via the first EMC capacitor; and
a second electromagnetic compatibility (EMC) capacitor connected in series between the second output and the ground conductor and connected in series between the fourth output and the ground conductor, wherein the AC noise bypassed to the second output is directed from the second output to the ground conductor via the second EMC capacitor and AC noise bypassed to the fourth output is directed from the fourth output to the ground conductor via the second EMC capacitor.

16. The PD of claim 14, comprising:
wherein the PD chip is configured to receive a PoE power from the first and second power lines via the diode bridge rectifier and supply operating power to other components of the PD based on the PoE power.

17. A method comprising:
receiving AC noise at a first input of a rectifier of power-over-Ethernet (POE) reception circuitry in a PoE powered device (PD), wherein the first input is connected to a first output of the rectifier via a first rectifying element and a first capacitor which are connected in parallel between the first input and the first output;
bypassing the AC noise from the first input to the first output via the first capacitor;

directing the bypassed noise from the first output to a ground conductor via a second capacitor connected in series between the first output and the ground conductor;

receiving AC noise at a second input of the rectifier, wherein the second input is connected to a second output of the rectifier via a second rectifying element and a third capacitor which are connected in parallel between the second input and the second output;

bypassing the AC noise from the second input to the second output via the third capacitor; and directing the bypassed noise from the second output to the ground conductor via a fourth capacitor connected in series between the second output and the ground conductor.

* * * * *